United States Patent
Sirak et al.

(10) Patent No.: US 10,787,623 B2
(45) Date of Patent: Sep. 29, 2020

(54) HYDROGENATED POLYBUTADIENES USEFUL AS LUBRICANT ADDITIVES

(71) Applicant: Evonik Operations GmbH, Essen (DE)

(72) Inventors: Sofia Sirak, Norristown, PA (US); Holger Pletsch, Essen (DE); Marius Kemper, Heiden (DE)

(73) Assignee: Evonik Operations GmbH, Essen (DE)

( * ) Notice: Subject to any disclaimer, the term of this patent is extended or adjusted under 35 U.S.C. 154(b) by 53 days.

(21) Appl. No.: 15/906,700

(22) Filed: Feb. 27, 2018

(65) Prior Publication Data

US 2018/0245013 A1 Aug. 30, 2018

(30) Foreign Application Priority Data

Feb. 28, 2017 (EP) ..................................... 17158306

(51) Int. Cl.
| | |
|---|---|
| *C10L 1/16* | (2006.01) |
| *C10M 143/14* | (2006.01) |
| *C08F 236/06* | (2006.01) |
| *C10M 169/04* | (2006.01) |
| *C08F 136/06* | (2006.01) |
| *C08F 8/04* | (2006.01) |

(52) U.S. Cl.
CPC .............. *C10M 143/14* (2013.01); *C08F 8/04* (2013.01); *C08F 136/06* (2013.01); *C08F 236/06* (2013.01); *C10M 169/041* (2013.01); *C08F 2800/20* (2013.01); *C10M 2205/08* (2013.01); *C10N 2240/04* (2013.01); *C10N 2240/042* (2013.01); *C10N 2240/044* (2013.01); *C10N 2240/045* (2013.01); *C10N 2240/08* (2013.01); *C10N 2240/10* (2013.01); *C10N 2270/00* (2013.01)

(58) Field of Classification Search
CPC .............. C10M 143/06; C10M 143/12; C10M 143/14; C10M 169/041; C10M 2205/08; C10M 2205/026; C08F 8/04; C08F 136/06; C08F 236/06; C08F 2800/20; C08F 36/06; C10N 2270/00; C10N 2240/04; C10N 2240/10; C10N 2240/08; C10N 2230/02

USPC ......................................................... 508/591
See application file for complete search history.

(56) References Cited

U.S. PATENT DOCUMENTS

| | | | |
|---|---|---|---|
| 2,864,809 A | | 12/1958 | Jones et al. |
| 3,312,621 A | | 4/1967 | Brownawell et al. |
| 3,329,613 A | | 7/1967 | Fischer et al. |
| 3,541,064 A | | 11/1970 | Yoshimoto et al. |
| 3,600,311 A | | 8/1971 | Naiman et al. |
| 5,310,814 A | | 5/1994 | Struglinski et al. |
| 5,945,485 A | * | 8/1999 | Struglinski ............. C08C 19/02 508/591 |
| 6,797,776 B1 | | 9/2004 | Suzuki et al. |
| 2009/0312449 A1 | | 12/2009 | Sasaki et al. |
| 2013/0229016 A1 | | 9/2013 | Ghahary et al. |
| 2014/0274842 A1 | | 9/2014 | McDougall et al. |

FOREIGN PATENT DOCUMENTS

| | | |
|---|---|---|
| CA | 2 338 689 A1 | 2/2000 |
| DE | 24 59 115 A1 | 6/1975 |
| EP | 0 318 848 B1 | 5/1991 |
| EP | 1 243 616 A1 | 9/2002 |
| EP | 1 985 641 A1 | 10/2008 |
| GB | 1030306 | 5/1966 |
| WO | 92/16568 | 10/1992 |
| WO | 01/42319 A1 | 6/2001 |
| WO | 2014/075901 A1 | 5/2014 |
| WO | 2015/040095 A1 | 3/2015 |

OTHER PUBLICATIONS

Extended European Search Report dated Sep. 4, 2017, in European Patent Application No. 17158306.5.
N. K. Singha et al., "Hydrogenation of diene elastomers, their properties and applications: A critical review", Rubber Chemistry and Technology, 1996, vol. 70, p. 309-367.
H.L. Hsieh, et al., "Anionic Polymerization: Principles and Practical Applications", Marcel Dekker, Inc., 1996, 231 pages.
European Search Report dated Aug. 23, 2018 in Patent Application No. 18156618.3, 4 pages.

* cited by examiner

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

The invention relates to low molecular weight hydrogenated polybutadienes and to a method for the preparation of these polymers. The invention is also directed to lubricant compositions comprising these polymers and uses thereof.

13 Claims, No Drawings

HYDROGENATED POLYBUTADIENES USEFUL AS LUBRICANT ADDITIVES

TECHNICAL FIELD OF THE INVENTION

The present invention relates to low molecular weight hydrogenated polybutadienes and to a method for the preparation of these polymers. The present invention is also directed to lubricant compositions comprising these polymers, and to the uses of these lubricant compositions as an automatic transmission fluid, a manual transmission fluid, a continuously variable transmission fluid, an engine oil, a gear oil formulation, an industrial gear oil formulation, an axle fluid formulation, a dual clutch transmission fluid, a dedicated hybrid transmission fluid or as a hydraulic oil.

BACKGROUND OF THE INVENTION

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils.

A typical lubricant composition includes a base fluid and optionally one or more additives. Conventional base fluids are hydrocarbons, such as mineral oils. The terminology base oil or base fluid is commonly used interchangeably. Here, base fluid is used as a general term.

A wide variety of additives may be combined with the base fluid, depending on the intended use of the lubricant. Examples of lubricant additives include, but are not limited to, viscosity index improvers, thickeners, oxidation inhibitors, corrosion inhibitors, dispersing agents, high pressure additives, anti-foaming agents and metal deactivators.

Typical non-polymeric base fluids are less effective as lubricants, because of their low viscosity and further decreased viscosity at higher operating temperatures. Therefore, polymeric additives are used to thicken the base oil and reduce the change in viscosity with change in temperature. The term Viscosity Index (VI) is used to describe this change in viscosity with temperature. The lower the VI, the greater the change in viscosity with temperature, and vice versa. Thus, a high VI is desired for lubricant formulations. In order to improve VI, polymeric additives or Viscosity Index Improvers (VII) may be added to a lubricant formulation. The drawback of adding polymeric additives to a lubricant formulation is that they will undergo shear stress and will mechanically degrade over time. Higher molecular weight polymers are better thickeners, but will be more prone to shear stress leading to polymer degradation. In order to decrease the amount of polymer degradation, the molecular weight of a polymer can be decreased, thereby obtaining a more shear stable polymer. These shear stable low molecular weight polymers are no longer very effective thickeners, and must be used in larger concentrations in the lubricant in order to reach a desired viscosity. These low molecular weight polymers typically have molecular weights below 20,000 g/mol and are also called synthetic high viscosity base fluids.

Common synthetic base fluids are polyalphaolefins, polyalkylmethacrylates, and ethylene-propylene copolymers, whose key feature is good handling properties in term of viscosity since these base fluids are polymeric in nature and provide for an improved viscosity index.

U.S. Pat. Nos. 5,945,485 and 3,312,621 disclose the use of hydrogenated block copolymers comprising 1,4-butadiene and 1,2-butadiene monomer units. The copolymer is hydrogenated and comprises at least 10 wt % of at least one crystallizable segment and at least one low crystallinity segment. The polymers are said to be useful as viscosity index improvers.

EP0318848B1 describes hydrogenated block copolymers of butadiene in AB block structure having a number-average molecular weight above 30,000 g/mol. These polymers would be too viscous to use as a synthetic base fluid. Furthermore, the high molecular weights would not provide enough shear stability required from a base fluid.

U.S. Pat. No. 3,312,621 describes butadiene copolymers with number-average molecular weights from 75,000 to 300,000 g/mol, preferably from 150,000 to 250,000 g/mol. These copolymers have a block structure and have at least 90% 1,4 configuration and are not hydrogenated.

U.S. Pat. No. 5,310,814 discloses non-hydrogenated block copolymers of 1,2-butadiene and 1,4 butadiene as viscosity index improvers. The use as a synthetic base fluid is not disclosed, and recommended weight percent in oil is in the range of 0.1 wt % to 3 wt %, typical of a Viscosity Index Improver.

U.S. Pat. No. 3,600,311 discloses hydrogenated copolymers of butadiene where 45-95 wt % of the butadiene monomers are in 1,4 configuration, and 10-55 wt % of the butadiene in 1,2 configuration. The polymers are shown to be useful additives to control wax deposition.

U.S. Pat. No. 3,329,613 relates to the use of non-hydrogenated polybutadiene polymers useful as oil additives. The disclosed polymers should be substantially in 1,4 configuration.

Existing products, such as polyalphaolefins (PAOs), do not have the necessary performance level for some applications. There is also a need to provide alternative solutions in the area of industrial gear oils and not only for industrial lubricants. In particular, it would be desirable to replace existing high viscosity polyalphaolefins, as these products are expensive, require a large quantity of polymer to thicken to the desired viscosity, and do not provide sufficient solubility for crucial formulation components. It was therefore an object of the present invention to provide highly shear stable synthetic base fluids or lubricating oil additives, which, in lubricant oil compositions, have a positive influence on oil solubility and component solubility, as well as on low temperature performance. Furthermore, these new polymers should be able thicken an oil to a desired viscosity using a lower quantity of polymer compared to the typically used polyalphaolefins. These highly shear stable polymers should also have a high viscosity index, high flash point, and good oxidative stability.

SUMMARY OF THE INVENTION

After thorough investigation, the inventors of the present invention have surprisingly found that hydrogenated polybutadienes with weight-average molecular weights comprised in the range between 2,000 g/mol and 10,000 g/mol as defined in claim 1 are useful as highly shear stable lubricating oil additives or synthetic base fluids, depending on their treat rate in the lubricating composition. The polymers are hydrogenated homopolymers of butadiene consisting of a statistical distribution of repeat units derived from 1,2 addition and 1,4 addition as defined in claim 1. Polybutadiene repeat units derived from 1,2 addition are also designated as "1,2-polybutadiene" or as "polybutadiene of monomer units of 1,2-butadiene". The unsaturated double bond of 1,2-polybutadiene is a terminal, vinyl-type unsaturation. Polybutadiene repeat units derived from 1,4 addition are also designated as "1,4-polybutadiene" or as "polybutadiene of monomer units of 1,4-butadiene". The unsaturated double bond of 1,4-polybutadiene is an internal-type unsaturation, either in cis or trans configuration. In order to maintain good oil solubility and good low temperature performance, a certain weight ratio of 1,2 to 1,4 addition is needed. In particular, the hydrogenated polybutadiene of the invention consists of 25 to 45% by weight of monomer units of 1,4-butadiene and 55 to 75% by weight of monomer units of 1,2-butadiene, based on the total weight of the hydrogenated polybutadiene, and also has a hydrogenation degree of more than 99%.

The weight-average molecular weights of the claimed hydrogenated polybutadienes are determined by gel permeation chromatography (GPC) using polybutadiene as standard and THF as eluent.

In a preferred embodiment of the invention, the hydrogenated polybutadiene consists of 30 to 45% by weight of monomer units of 1,4-butadiene and 55 to 70% by weight of monomer units of 1,2-butadiene, based on the total weight of the hydrogenated polybutadiene.

In an even more preferred embodiment of the invention, the hydrogenated polybutadiene consists of 30 to 40% by weight of monomer units of 1,4-butadiene and 60 to 70% by weight of monomer units of 1,2-butadiene, based on the total weight of the hydrogenated polybutadiene.

In another preferred embodiment of the invention, the hydrogenated polybutadiene has a polydispersity index (PDI) comprised in the range between 1.0 and 1.5. According to a particular embodiment of the invention, the hydrogenated polybutadiene has a PDI comprised in the range between 1.0 and 1.2.

According to a particular embodiment of the invention, the hydrogenated polybutadiene has a weight-average molecular weight comprised in the range between 3,000 g/mol and 9,000 g/mol, even more preferably comprised in the range between 4,000 g/mol and 8.000 g/mol.

According to another aspect, the present invention also relates to a process for preparing the hydrogenated polybutadiene of the invention, the process comprising the following steps:
(i) preparing a polybutadiene by anionic polymerization of 1,3-butadiene in a first step, and
(ii) hydrogenating the polybutadiene of step (i) by catalytic hydrogenation in a second step.

According to a preferred embodiment of the process, the anionic polymerization of step (i) is conducted in at least one solvent selected from aliphatic, cycloaliphatic or aromatic hydrocarbon solvents, using organometallic reagents as initiators and in absence of any oxygen and protic reagents.

Among the organometallic reagents, organosodium, organolithium or organopotassium are preferred.

The present invention also relates to a lubricating oil composition comprising a base oil and at least one hydrogenated polybutadiene of the present invention.

In a preferred embodiment of the invention, the lubricating oil composition comprises from 50 to 99.9% by weight of at least one base oil and from 0.01 to 50% by weight of at least one hydrogenated polybutadiene according to the present invention, based on the total weight of the lubricating composition. Depending on the application of the lubricating oil composition, the treat rate of the hydrogenated polybutadiene in the oil formulation is adapted. According to the present invention, the hydrogenated polybutadiene may be considered as a lubricating oil additive (for low treat rate) or as a synthetic base fluid (for high treat rate) depending on the treat rate in the lubricating oil composition.

The present invention also relates to the use of the hydrogenated polybutadiene according to the invention as a lubricating oil additive or base fluid, in particular, in an automatic transmission fluid, a manual transmission fluid, a continuously variable transmission fluid, an engine oil, a gear oil formulation, an industrial gear oil formulation, an axle fluid formulation, a dual clutch transmission fluid, a dedicated hybrid transmission fluid or in a hydraulic oil.

DETAILED DESCRIPTION OF THE INVENTION

Hydrogenated Polybutadienes According to the Invention

The inventors of the present invention have found that in order to achieve the desired performance, the weight-average molecular weight of the hydrogenated polybutadiene polymer of the invention has to be comprised in the range between 2,000 and 10,000 g/mol.

In a preferred embodiment, the polydispersity index PDI of the hydrogenated polybutadiene is comprised in the range between 1.0 and 1.5. According to a particular embodiment of the invention, the hydrogenated polybutadiene has a PDI comprised in the range between 1.0 and 1.2.

According to the present invention, the claimed hydrogenated polybutadiene has a hydrogenation degree of more than 99%. The degree of hydrogenation is defined as the molar degree of saturation of carbon-carbon bonds through addition of hydrogen relative to the non-hydrogenated polymer. Usually, hydrogenation degree is probed via nuclear magnetic resonance (NMR) spectroscopy or by determination of the iodine value. The degree of hydrogenation of the hydrogenated polybutadiene according to the present invention is measured by quantitative proton nuclear magnetic resonance (Proton 1H NMR) in deuterated chloroform solution using dimethyl terephthalate as standard. The chemical shifts are calibrated using the solvent signal. To determine the hydrogenation degree, the respective signal integrals of the standard are put into relation with the signal integrals of the olefinic protons. It is necessary for each sample to repeat said measurement and determination using non-hydrogenated reference sample in order to define 0% degree of hydrogenation.

As explained above, the inventive hydrogenated polybutadienes are prepared in a two-step process, the first step corresponding to the preparation of the polybutadiene polymer and the second step being the hydrogenation of the polybutadiene polymer.

First Process Step: Polybutadiene Preparation

According to the first step of the process, the polybutadiene polymer of the invention is prepared via living anionic polymerization of 1,3-butadiene monomer.

This type of reaction is well-established and described in detail in H. L. Hsieh, R. P. Quirk. Anionic Polymerization. Principles and Practical Applications, 1996, Marcel Dekker, Inc. New York.

According to the present invention, batch or semi-batch type processes are preferred for living anionic polymerization of 1,3-butadiene, butadiene. Living polymerization in continuous process can also be considered.

The polymerization is commonly performed in aliphatic, cycloaliphatic or aromatic hydrocarbon solvents. Examples for aliphatic hydrocarbon solvents are hexane or heptane. Examples for cycloaliphatic hydrocarbon solvents are cyclohexane or methylcyclohexane. Examples for aromatic hydrocarbon solvents are benzene or toluene. Polar, heteroaliphatic solvents such as tertiary amines and/or ethers and/or cyclic ethers may also be used as solvents or co-solvents. Examples for tertiary amines are tetramethylenediamine or N,N,N',N",N"-pentamethyldiethylenediamine. Examples for ethers or cyclic ethers are diethyl ether and tetrahydrofuran. It is common to use solvent mixtures of aliphatic, cycloaliphatic or aromatic hydrocarbon solvents and polar, heteroaliphatic solvents.

Common initiators are organometallic reagents where the metal is from the group of alkali metals or from the group of alkaline earth metals. Typical examples are mono- or bi-functional organosodium, organolithium or organopotassiumas initiators such as n-butyl lithium, sec-butyl lithium, tert-butyl lithium, 1,1-diphenylhexyl lithium, diphenylmethyl lithium, 1,1,4,4,-tetraphenyl-1,4-dilithium butane, lithium naphthalene and their sodium and potassium homologues. According to the present invention, organolithium initiators are preferred and n-butyl lithium initiator is particularly preferred.

Under exclusion of oxygen and protic reagents, the living character of anionic polymerization provides excellent control over the resulting molecular weight and the polydispersity index PDI.

In general, the polymerization reaction is terminated using a protic reagent such as methanol, ethanol, 2-propanol or water for neutralization of the macroanion.

Such as described in WO2014075901, typical reaction temperatures range between 10° C. and 120° C. and typical reaction pressures range between 1 and 100 bar.

It is commonly known that the weight ratio of 1,2- and 1,4-addition is adjusted via the polarity of the reaction mixture and/or via the reaction temperature and/or via the type of counter ion. As already indicated above, according to the present invention, it is required that the hydrogenated polybutadiene consists of 25 to 45% by weight of monomer units of 1,4-butadiene and 55 to 75% by weight of monomer units of 1,2-butadiene, based on the total weight of the hydrogenated polybutadiene.

Second Step of the Process: Hydrogenation

A high hydrogenation degree of polybutadiene polymer of more than 99% is desired in order to improve stability against oxidation.

Catalytic hydrogenation of polybutadienes and other unsaturated hydrocarbon polydienes is well-established. A comprehensive overview is provided in the publication N. K. Singha, S. Bhattacharjee, S. Sivarim, *Hydrogenation of diene elastomers, their properties and applications: A critical review*, Rubber Chemistry and Technology, 1996, Vol. 70, p. 309-367. In general, said reaction is performed either in heterogeneous fashion using insoluble, supported metal catalysts or in homogeneous fashion using soluble, organometallic catalysts. A detailed description of homogeneously catalyzed hydrogenation can be found for example in U.S. Pat. No. 3,541,064 and GB 1,030,306. Since it offers economic advantages, heterogeneous catalysis using insoluble, supported metals as catalysts is widely used in industrial hydrogenation and usually preferred over homogeneous catalysis.

In general, hydrogenation of polybutadienes and other unsaturated hydrocarbon polydienes using insoluble, supported metals as catalysts is performed with the target to achieve a hydrogenation degree as high as possible (i.e. to yield a structure consisting of no unsaturated C—C bond) using a process with high reactivity and selectivity under absence of side reactions such as crosslinking through carbon-carbon coupling or degradation. Named targets also hold for the present hydrogenated polybutadiene. It is state of the art to meet these requirements by adjusting, amongst other parameters, the type of catalytically active metal, its type of support, its amount of loading on the support, its concentration, pressure, temperature and reaction time (c.f. WO 2015/040095, U.S. Pat. No. 2,864,809, DE 2,459,115, WO 01/42319).

In general, catalytically active metals for hydrogenation of polybutadienes and other unsaturated hydrocarbon polydienes include, but are not limited to, Ru, Rh, Pd, Ir, Pt, Mn, Cr, Fe, Co, Ni, U, Cu, Nd, In, Sn, Zn, Ag, Cr and alloys of one or more of these metals. Typical catalyst supports include, but are not limited to oxides ($Al_2O_3$, $TiO_2$, $SiO_2$ or others), carbon, kieselguhr or other carriers. Common heterogeneous hydrogenation processes such as packed bed or slurry catalyst application in either batch or continuous operation in either solution or bulk are applicable.

Hydrogenation according to the present invention is carried out using a heterogeneous $Al_2O_3$ supported Ru catalyst.

Lubricating Oil Compositions—Base Oils

As indicated above, the present invention also relates to a lubricating oil composition comprising a base oil and at least one hydrogenated polybutadiene of the present invention.

The base oils correspond to lubricant base oils, mineral, synthetic or natural, animal or vegetable oils suited to their use/chosen depending on the intended use.

The base oils used in formulating the lubricating oil compositions according to the present invention include, for example, conventional base stocks selected from API (American Petroleum Institute) base stock categories known as Group I, Group II, Group III. Group IV and Group V. The Group I and II base stocks are mineral oil materials (such as paraffinic and naphthenic oils) having a viscosity index (or VI) of less than 120. Group I is further differentiated from Group II in that the latter contains greater than 90% saturated materials and the former contains less than 90% saturated material (that is more than 10% unsaturated material). Group III is considered the highest level of mineral base oil with a VI of greater than or equal to 120 and a saturates level greater than or equal to 90%. Preferably the base oil included in the lubricating oil composition of the present invention is selected from the group consisting of API Group II and III base oils. Most preferably, the lubricant composition comprises an API Group III base oil. Group IV base oils are polyalphaolefins (PAO). Group V base oils are esters and any other base oils not included in Group I to IV base oils. These base oils can be used individually or as a mixture.

In a preferred embodiment of the invention, the lubricating oil composition comprises from 50 to 99.9% by weight of at least one base oil and from 0.01 to 50% by weight of at least one hydrogenated polybutadiene according to the present invention, based on the total weight of the lubricating composition.

All of the characteristics and preferences indicated above for the hydrogenated polybutadiene according to the present invention, base oils, process of the present invention apply to the lubricating oil compositions.

Additional Additives

The lubricating oil compositions according to the present invention may also comprise any other additional additives suitable for use in the formulations. These additives include viscosity index improvers, pour point depressants, dispersants, demulsifiers, defoamers, lubricity additives, friction modifiers, antioxidants, detergents, dyes, corrosion inhibitors and/or odorants.

Applications for the Hydrogenated Polybutadienes

The invention also relates to the use of the hydrogenated polybutadiene according to the present invention as a lubricating-oil additive or as a synthetic base fluid, depending on the treat rate in the lubricating oil composition.

The hydrogenated polybutadienes of the present invention and the lubricating oil compositions comprising the hydrogenated polybutadienes according to the invention are favorably used for driving system lubricating oils (such as manual transmission fluids, differential gear oils, automatic transmission fluids and belt-continuously variable transmission fluids, axle fluid formulations, dual clutch transmission fluids, and dedicated hybrid transmission fluids), hydraulic oils (such as hydraulic oils for machinery, power steering oils, shock absorber oils), engine oils (for gasoline engines and for diesel engines) and industrial oil formulations (such as wind turbine).

From the standpoint of the kinetic viscosity of the hydrogenated polybutadiene according to the present invention, the weight content of the hydrogenated polybutadiene in the lubricating oil composition is preferably comprised in the range between 1 wt % and 50 wt % in term of the weight of hydrogenated polybutadiene, based on the total weight of the lubricating oil composition.

If the lubricating oil composition according to the present invention is used as an engine oil, it preferably comprises between 2 wt % and 20 wt % of hydrogenated polybutadiene of the invention in the base oil, based on the total weight of the lubricating oil composition, leading to a kinetic viscosity at 100° C. being in the range from 4 mm$^2$/s to 10 mm$^2$/s.

If the viscosity index improver of the present invention is used as a automotive gear oil, it preferably comprises between 3 wt % to 30 wt % of the hydrogenated polybutadiene in the base oil, based on the total weight of the lubricating oil composition, leading to a kinetic viscosity at 100° C. is in the range from 2 mm$^2$/s to 10 mm$^2$/s.

If the viscosity index improver of the present invention is used as an automatic transmission oil, it preferably comprises between 3 wt % and 25 wt % of the hydrogenated polybutadiene in the base oil, based on the total weight of the lubricating oil composition, leading to a kinetic viscosity at 100° C. is in the range from 2 mm$^2$/s to 6 mm$^2$/s.

If the viscosity index improver of the present invention is used as an industrial gear oil, it preferably comprises between 15 wt % and 50 wt % of the hydrogenated polybutadiene in the base oil, based on the total weight of the lubricating oil composition, leading to a kinetic viscosity at 100° C. is in the range from 10 mm$^2$/s to 40 mm$^2$/s.

The present invention is further illustrated by the following non-limiting examples.

EXPERIMENTAL PART

The invention is further illustrated in detail hereinafter with reference to examples and comparative examples, without any intention to limit the scope of the present invention.

Sample Preparation

Example 1 was prepared by a two-step procedure, including anionic polymerization of 1,3-butadiene in the first step and catalytic hydrogenation in the second step. Anionic polymerization of 1,3-butadiene was performed by charging a water- and oxygen-free 5 l autoclave with 1527 g cyclohexane (purified over molecular sieves), 48 g tetrahydrofuran (THF) and 91 g n-butyl lithium solution (2.0 M in cyclohexane). Under vigorous stirring at T=40° C. and p=3.7 bar, 1068 g butadiene (purified over molecular sieves) were added at a rate of 800 g/h, yielding a final pressure of 6.3 bar. Instantaneously, the reaction mixture was cooled to T=20° C. and 38 g methanol were added at p=1 bar. After 30 min, the mixture was filtered, followed by evaporation of the volatile solvents. The following properties hold for the obtained polybutadiene: Mw=4.8 kg/mol; PDI=1.06; 1,2-content=75 wt %; 1,4-content=25 wt %.

For catalytic hydrogenation, 1.5 L of a 50 wt % solution of the obtained polybutadiene in cyclohexane was charged to a 2 L autoclave with catalyst basket according to the Robinson-Mahoney method and 8 g of a 3% Ru/Al$_2$O$_3$ shell catalyst were introduced. Hydrogenation was carried out for 24 hours at T=120° C. and H$_2$ pressure of p=200 bar. The discharge was filtered and volatile solvents were evaporated. The hydrogenation degree of the obtained hydrogenated polybutadiene is 100%.

Examples 2-13 were prepared along the lines of example 1, except for the amounts of raw materials used during anionic polymerization as well as the solids content during hydrogenation as stated in Table 1. Examples 11 and 12 are AB block copolymer samples where A/B=50/50 (wt/wt).

TABLE 1

Preparation of examples 2-13

| Raw materials | | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Cyclohexane | [g] | 1528 | 1528 | 1528 | 1285 | 1789 | 1529 | 1208 | 1528 | 2323 | 1836 | 2285 | 1207 |
| THF | [g] | 26 | 22 | 22 | 13 | 24 | 12 | 11 | 162 | 3 | 124* | 4* | 46 |
| n-butyl lithium (2.0M in cyclohexane) | [g] | 91 | 91 | 117 | 44 | 86 | 92 | 33 | 86 | 82 | 66 | 2 | 329 |
| butadiene | [g] | 1068 | 1069 | 1068 | 854 | 449 | 1068 | 855 | 1068 | 424 | 821 | 426 | 855 |
| methanol | [g] | 38 | 38 | 49 | 18 | 36 | 38 | 14 | 107 | 38 | 83 | 3 | 136 |
| Solids content during hydrogenation | [wt % in cyclohexane] | 50 | 50 | 50 | 40 | 60 | 50 | 35 | 50 | 54 | 50 | (**) | 70 |

*THF added only after 50 wt % of butadiene monomer feed was added
**Hydrogenation was not performed because of poor solubility Test Methods Used The weight-average molecular weight Mw and the polydispersity index PDI of the hydrogenated polybutadienes of the invention were determined using a Tosoh EcoSEC GPC system "HLC-8320" equipped with a PSS SDV 5 μm pre-column and a 30 cm PSS SDV 5 μm linear S separation column, as well as an RI detector at a flow rate of 0.3 mL/min at T=40° C. with tetrahydrofuran (THF) as eluent against polybutadiene calibration standards.

The weight-average molecular weights of the comparative polyalphaolefin (PAO), polyalkylmethacrylate (PAMA), and olefin copolymer (OCP) samples were determined by gel permeation chromatography (GPC) using using polymethylmethacrylate calibration standards and THF as the eluent.

The 1,2- and 1,4-addition weight contents, as well as the hydrogenation degree of the hydrogenated polybutadiene according to the invention were determined by means of $^1$H-NMR spectroscopy in deuterated chloroform.

Kinematic Viscosity was measured according to ASTM D 445.

The low-temperature, low shear-rate viscosity of automatic transmission fluids, gear oils, torque and tractor fluids, and industrial and automotive hydraulic oils are of considerable importance to the proper operation of many mechanical devices. In order to measure the low temperature viscosity performance of fluid, a Brookfield viscometer can be used. Brookfield viscosities reported in the lubricant formulation examples were measured according to ASTM D 2983 at a temperature of −30° C.

The pour point of a petroleum product is an index of the lowest temperature of its utility for certain applications. Flow characteristics, like pour point, can be critical for the correct operation of lubricating systems, fuel systems, and pipeline operations. The pour point (PP) of the examples shown were measured according to ASTM D 97.

Viscosity loss was measured after 100 hours at 40° C. in the tapered roller bearing test according to DIN 51350 T6. Viscosity loss is calculated as $1-KV40_{after}/KV40_{before}$.

Flash point was measured using the Cleveland Open Cup Tester according to ASTM D 92.

Thermal oxidative degradation was measured via thermogravimetry using a TGA Q5000 instrument from TA Instruments. Analysis was done under air using a temperature range of room temperature to 505° C. at a rate of 5° C. per minute. The instrument recorded the initial weight of the sample as well as the weight loss versus temperature. At the completion of the test, the derivative thermogravimetry (DTG) results were obtained using the computer software. For each sample, one main, narrow peak was observed representing at least 98% of the weight loss. The derivative peak temperature or DTG peak temperature was recorded and used to compare the various polymers.

Oils and Comparative Samples

PAO 8 is a copolymer of different alpha olefins with a KV100 of 8 cSt. The sample used for the examples is a commercial product, Synfluid® PAO 8 from Chevron Phillips.

Additin® RC 9420 is a commercial industrial gear oil additive package from Rhein Chemie Additives.

The comparative example, PAO, is commercially available product from Chevron Phillips. It is a high viscosity Group IV base fluid (Synfluid® PAO100), which is a homopolymer of 1-decene.

The comparative example, PAMA, is copolymer of C12-15 methacrylates synthesized according to Example 1 in US20130229016A1.

The comparative example, OCP, is a commercial product Lucant@ HC-600 from Mitsui Chemicals, and corresponds to hydrocarbon based synthetic oils having no polar groups and being copolymers of ethylene and propylene (olefin copolymer (OCP)).

Explanation of the Results Shown in Tables 2 and 3

Table 2 shows some properties of the bulk polymers. The bulk viscosity of the hydrogenated polybutadienes are in the same range as the polyalkylmethacrylate, olefin copolymer, and polyalpha olefin. Indeed, inventive examples 1 to 6 show a broad range of viscosities with small changes in molecular weight, making the inventive polymers of the present invention suitable for a wide range of applications and viscosity grades. Their outstanding viscosity property comply with the handling property requirements of any base fluid. In addition, the Viscosity Index and Pour Point of the hydrogenated polybutadiene are also very good for lubricant application.

Table 3 shows some industrial gear oil lubricant formulations made with the various polymers. All polymers were blended in a low viscosity base fluid, PAO8, to a viscosity of 320 cSt at 40° C. Additin® RC 9420 was also included in the formulation mixture at 1.8 wt %.

The inventive examples 1 to 6 show that a lower amount of polymer is needed to achieve the KV40 of 320 cSt compared to standard base oil such as a polyalkylmethacrylate (Ex. PAMA) and a polyalphaolefin (Ex. PAO).

Thus, all experimental data show that the polymers according to the present invention provide an excellent thickening efficiency while maintaining a good viscosity index, pour point, and Brookfield viscosity.

When comparing the formulations made with polyalphaolfin (PAO) and the polybutadiene of Example 3, both formulations provide similar KV40, viscosity indexes, pour points, and shear stability; but the hydrogenated polybutadiene formulation uses 49 wt % less polymer. This significantly decreased amount of polymer according to the present invention provides economic advantage. A similar advantage can be seen when comparing the formulations made with polyalkylmethacrylate (Ex. PAMA) and the hydrogenated polybutadiene of inventive Example 5. Here, 51.1 wt % less hydrogenated polybutadiene polymer is needed to achieve the same KV40, and the formulation made with inventive example 5 provides an improved Brookfield Viscosity at −30° C. and viscosity index with no disadvantage in other formulation properties. The formulation using the OCP polymer (Ex, OCP) can also be compared to the formulation made with inventive example 5. Formulation properties are similar, but the hydrogenated polybutadiene formulation provides these properties using 21.6 wt % less polymer.

Furthermore, the low weight-average molecular weight and narrow PDI of the polymers according to the invention enable the polymers to have excellent shear stability. The viscosity loss after a 100 hr tapered roller bearing test is less than 3%, which is surprisingly good for a polymer that provides such a good thickening efficiency.

The inventors of the present invention have found that the weight ratio of 1,2 addition to 1,4 addition effects the Brookfield −30° C. viscosity and pour point. In particular, the inventors have found that the hydrogenated polybutadiene must consist of 25 to 45 weight % of monomer units of 1,4-butadiene and 55 to 75 weight % of monomer units of 1,2-butadiene, based on the total weight of the hydrogenated polybutadiene. Indeed, if the weight ratio of 1,2:1,4 addition is too high or too low, the Brookfield −30° C. viscosity and pour point are increased. Therefore, it is important to stay within the weight ratio mentioned above in order to maintain good low temperature properties. This effect can be seen when comparing the polybutadienes of inventive example 3 with comparative example 7. Both have similar weight-average molecular weights, but the hydrogenated polybutadiene of comparative example 7 has an increased amount of 1,4 addition. The resulting formulation made with comparative example 7 has a drastic increase in Brookfield viscosity at −30° C. This is further shown by comparative example 10 which also has a very high amount of 1,4 addition. This hydrogenated polybutadiene is no longer soluble in oil. The bad influence on the low temperature property is also shown in comparative example 9, where there is a very high amount of 1,2 addition. This polymer also display poor Brookfield viscosity at −30° C.

A weight-average molecular weight outside the claimed range also shows a poor shear stability if the molecular weight is higher than the claimed ranged (see comparative Example 8) and poor viscosity index and very poor Brookfield viscosity if the molecular weight is below the claimed range (see comparative example 13).

Ex. 11 shows that a hydrogenated polybutadiene having a block structure with crystalline segment, such as known in the prior art, gives extremely poor solubility (solid at room temperature).

Ex. 12, is a high molecular weight block polybutadiene as disclosed in the prior art. Ex. 12 was extremely high viscosity showing very poor solubility in non-polar solvent.

The formulation in Table 3 containing the hydrogenated polybutadiene (Ex. 5), has a higher flash point than the formulation containing Ex. PAO. The flash point of the formulation containing Ex. PAMA shows a comparable flash point. These results demonstrate that hydrogenated polybutadiene does not have any disadvantage compared to the state-of-the-art technology.

Ex. 1, Ex. 2, and Ex. 4 show improved thermal oxidative stability compared to the Ex. PAMA or Ex. PAO. These examples have a higher DTG peak temperatures compared to Ex. PAMA and Ex. PAO.

The formulations in Table 3 containing the hydrogented polybutadienes were also submitted to a 60 day storage test to ensure that the formulation components were soluble and stable in solution. No separation was observed in this time.

TABLE 2

Bulk Polymer Properties

| Polymer Examples | | Inventive Examples | | | | | | Comparative Examples | |
|---|---|---|---|---|---|---|---|---|---|
| | | Ex. 1 | Ex. 2 | Ex. 3 | Ex. 4 | Ex. 5 | Ex. 6 | PAMA | PAO |
| C12-C15 methacrylates | [wt %] | | | | | | | 100 | |
| 1-decene | [wt %] | | | | | | | | 100 |
| olefin copolymer | [wt %] | | | | | | | | |
| Butadiene: 1,2 addition | [wt %] | 75 | 66 | 64 | 61 | 60 | 59 | | |
| Butadiene: 1,4- addition | [wt %] | 25 | 34 | 36 | 39 | 40 | 41 | | |
| Mw | [kg/mol] | 4.3 | 4.6 | 4.9 | 3.6 | 7.4 | 2.3 | 13.5 | 7.5 |
| PDI | | 1.1 | 1.1 | 1.1 | 1.1 | 1.1 | 1.1 | 1.7 | 2.0 |
| Viscosity at 100° C. | [cSt] | 633 | 602 | 445 | 344 | 967 | 125 | 475 | 102 |
| Viscosity at 40° C. | [cSt] | 22.632 | 16.264 | 10.154 | 75.02 | 21.397 | 2.504 | 11.780 | 1.780 |
| Viscosity Index | | 175 | 194 | 192 | 181 | 240 | 135 | 188 | 137 |
| Derivative thermogravimetric peak temperature | [° C.] | 351 | 349 | | 342 | | | 311 | 340 |
| Pour Point | [° C.] | −9 | −12 | −15 | −21 | −12 | −27 | −12 | −36 |

| Polymer Examples | | Comparative Examples | | | | | | | |
|---|---|---|---|---|---|---|---|---|---|
| | | OCP | Ex. 7 | Ex. 8 | Ex. 9 | Ex. 10 | Ex. 11 | Ex. 12 | Ex. 13 |
| C12-C15 methacrylates | [wt %] | | | | | | | | |
| 1-decene | [wt %] | | | | | | | | |
| olefin copolymer | [wt %] | 100 | | | | | | | |
| Butadiene: 1,2 addition | [wt %] | | 51 | 37.8 | 82.7 | 17.5 | A block: 15 B block: 83 | A block: 15 B block: 83 | 66.7 |
| Butadiene: 1,4- addition | [wt %] | | 49 | 42.2 | 17.3 | 82.5 | A block: 85 B block: 17 | A block: 85 B block: 17 | 33.3 |
| Mw | [kg/mol] | 11.1 | 5.3 | 10.9 | 3.5 | 2.4 | 4.6 | 46.2 | 1.0 |
| PDI | | 2.0 | 1.1 | 1.1 | 1.1 | 1.1 | 1.1 | 1.1 | 1.1 |
| Viscosity at 100° C. | [cSt] | 600 | 735 | 4.913 | 1.157 | n.m. | 736 | n.m. | 40 |
| Viscosity at 40° C. | [cSt] | 9.850 | 14.649 | 131.528 | 79.298 | n.m. | n.m. | n.m. | 479 |
| Viscosity Index | | 240 | 233 | 316 | 161 | | | | 130 |
| Derivative thermogravimetric peak temperature | [° C.] | | | | | | | | |
| Pour Point | [° C.] | −15 | −9 | n.m. | n.m. | n.m. | n.m. | n.m. | | n.m. = not measurable

TABLE 3

Industrial gear oil formulations (with high treat rate of above 15 wt % based on the total weight of the formulation)

| | | Inventive examples | | | | | | Comparative Examples | | | | |
|---|---|---|---|---|---|---|---|---|---|---|---|---|
| Lubricant Example | | Ex. 1 | Ex. 2 | Ex. 3 | Ex. 4 | Ex. 5 | Ex. 6 | PAMA | PAO | OCP | Ex. 7 | Ex. 8 |
| PAMA | [wt %] | | | | | | | 46.7 | | | | |
| PAO | [wt %] | | | | | | | | 59.5 | | | |
| OCP | [wt %] | | | | | | | | | 29.1 | | |
| Ex. 1 | [wt %] | 30.5 | | | | | | | | | | |
| Ex. 2 | [wt %] | | 30.0 | | | | | | | | | |
| Ex. 3 | [wt %] | | | 29.8 | | | | | | | | |
| Ex. 4 | [wt %] | | | | 34.9 | | | | | | | |
| Ex. 5 | [wt %] | | | | | 22.8 | | | | | | |
| Ex. 6 | [wt %] | | | | | | 49.7 | | | | | |
| Ex. 7 | [wt %] | | | | | | | | | | 27.4 | |
| Ex. 8 | [wt %] | | | | | | | | | | | 17.8 |
| Ex. 9 | [wt %] | | | | | | | | | | | |
| Ex. 11 | [wt %] | | | | | | | | | | | |
| Ex. 13 | [wt %] | | | | | | | | | | | |
| Additin ® RC 9420 | [wt %] | 1.8 | 1.8 | 1.8 | 1.8 | 1.8 | 1.8 | 1.8 | 1.8 | 1.8 | 1.8 | 1.8 |
| PAO8 | [wt %] | 67.7 | 68.2 | 68.4 | 63.3 | 75.4 | 48.5 | 51.5 | 38.7 | 69.1 | 70.8 | 80.4 |
| Formulation Results | | | | | | | | | | | | |
| Viscosity at 100° C. | [cSt] | 35.4 | 35.7 | 36.1 | 35.1 | 38.3 | 33.1 | 37.3 | 35.9 | 38.3 | 38.4 | 39.9 |
| Viscosity at 40° C. | [cSt] | 320.7 | 320.6 | 320.4 | 318.6 | 322 | 319.6 | 320.8 | 319.8 | 321.3 | 320.6 | 322.7 |
| Viscosity Index | | 151 | 158 | 160 | 156 | 169 | 145 | 166 | 159 | 170 | 170 | 177 |
| Flash Point | [° C.] | | | | | 248 | | 246 | 238 | | | |
| Pour Point | [° C.] | −42 | −48 | −48 | −48 | −48 | −45 | −51 | −48 | −51 | −42 | −48 |
| Brookfield Viscosity at −30° C. | [mPas] | 112.000 | 98.000 | 98.000 | 108.000 | 78.000 | 140.000 | 87.000 | 90.000 | 76.000 | 176.000 | 71.000 |
| Viscosity Loss at 40° C. after 100 h (DIN 51350 T6) | [%] | 1.5 | 0.5 | 0.5 | 1.9 | 2.4 | 2.1 | 1.5 | 0.6 | 2.6 | 2.6 | 16.3 |

| | | Comparative Examples | | | | |
|---|---|---|---|---|---|---|
| Lubricant Example | | Ex. 9 | Ex. 10 | Ex. 11 | Ex. 12 | Ex. 13 |
| PAMA | [wt %] | | Ex. 10 is not soluble in PAO8 | | Ex. 12 is not soluble in PAO8 | |
| PAO | [wt %] | | | | | |
| OCP | [wt %] | | | | | |
| Ex. 1 | [wt %] | | | | | |
| Ex. 2 | [wt %] | | | | | |
| Ex. 3 | [wt %] | | | | | |
| Ex. 4 | [wt %] | | | | | |
| Ex. 5 | [wt %] | | | | | |
| Ex. 6 | [wt %] | | | | | |
| Ex. 7 | [wt %] | | | | | |
| Ex. 8 | [wt %] | | | | | |
| Ex. 9 | [wt %] | 29.6 | | | | |
| Ex. 11 | [wt %] | | | 35.3 | | |
| Ex. 13 | [wt %] | | | | | 86.3 |
| Additin ® RC 9420 | [wt %] | 1.8 | | 1.8 | | 1.8 |
| PAO8 | [wt %] | 68.6 | | 62.9 | | 11.9 |
| Formulation Results | | | | | | |
| Viscosity at 100° C. | [cSt] | 32.16 | Not soluble | Blend of ex. 11 is solid at room temperature | Not soluble | 27.54 |
| Viscosity at 40° C. | [cSt] | 320.0 | | | | 319.3 |
| Viscosity Index | | 140 | | | | 115 |
| Flash Point | [° C.] | | | | | |
| Pour Point | [° C.] | −42 | | | | −47.3 |
| Brookfield Viscosity at −30° C. | [mPas] | 160.000 | | | | 252.000 |
| Viscosity Loss at 40° C. after 100 h (DIN 51350 T6) | [%] | 1.0 | | | | |

The invention claimed is:

1. A hydrogenated polybutadiene, consisting of:
   25 to 45% by weight of monomer units of 1,4-butadiene; and
   55 to 75% by weight of monomer units of 1,2-butadiene, based on a total weight of the hydrogenated polybutadiene; wherein:
   a weight ratio of the monomer units of 1,4-butadiene to the monomer units of 1,2-butadiene is a same statistical distribution throughout the length of the hydrogenated polybutadiene,
   a weight-average molecular weight of the hydrogenated polybutadiene is between 2,000 g/mol and 10,000 g/mol; and
   a hydrogenation degree of the hydrogenated polybutadiene is more than 99%, and
   wherein the hydrogenated polybutadiene is not a block polymer.

2. The hydrogenated polybutadiene according to claim 1, wherein the hydrogenated polybutadiene consists of 30 to 45% by weight of the monomer units of 1,4-butadiene and 55 to 70% by weight of the monomer units of 1,2-butadiene, based on the total weight of the hydrogenated polybutadiene.

3. The hydrogenated polybutadiene according to claim 2, wherein the hydrogenated polybutadiene consists of 30 to 40% by weight of the monomer units of 1,4-butadiene and 60 to 70% by weight of the monomer units of 1,2-butadiene, based on the total weight of the hydrogenated polybutadiene.

4. The hydrogenated polybutadiene according to claim 1, wherein a polydispersity index PDI of the hydrogenated polybutadiene is from 1.0 to 1.5.

5. The hydrogenated polybutadiene according to claim 4, wherein the polydispersity index PDI is from 1.0 to 1.2.

6. The hydrogenated polybutadiene according to claim 1, wherein the weight-average molecular weight of the hydrogenated polybutadiene is from 3,000 g/mol to 9,000 g/mol.

7. The hydrogenated polybutadiene according to claim 6, wherein the weight-average molecular weight of the hydrogenated polybutadiene is from 4,000 g/mol to 8,000 g/mol.

8. A process for preparing the hydrogenated polybutadiene of claim 1, the process comprising:
  (i) polymerizing 1,3-butadiene by anionic polymerization to obtain a polybutadiene; and
  (ii) hydrogenating the polybutadiene of step (i) by catalytic hydrogenation to obtain the hydrogenated polybutadiene.

9. The process of claim 8, wherein the anionic polymerization is conducted in at least one solvent selected from the group consisting of an aliphatic hydrocarbon solvent, a cycloaliphatic hydrocarbon solvent, an aromatic hydrocarbon solvent, a polar, heteroaliphatic solvent, and mixtures thereof, in the presence of at least one organometallic reagent as an initiator and in absence of any oxygen and protic reagents.

10. The process of claim 9, wherein the organometallic reagent is selected from the group consisting of an organosodium reagent, an organolithium reagent and an organopotassium reagent.

11. A lubricating oil composition, comprising a base oil and at least one hydrogenated polybutadiene of claim 1.

12. The lubricating oil composition as claimed in claim 11, comprising from 50 to 99.9% by weight of at least one base oil and from 0.01 to 50% by weight of the at least one hydrogenated polybutadiene, based on a total weight of the lubricating composition.

13. A composition, comprising the hydrogenated polybutadiene of claim 1 as a lubricating oil additive or synthetic base fluid, wherein the composition is selected from the group consisting of an automatic transmission fluid, a manual transmission fluid, a continuously variable transmission fluid, an engine oil, a gear oil formulation, an industrial gear oil formulation, an axle fluid formulation, a dual clutch transmission fluid, a dedicated hybrid transmission fluid and a hydraulic oil.

* * * * *